United States Patent [19]
Barnes et al.

[11] Patent Number: 6,143,391
[45] Date of Patent: Nov. 7, 2000

[54] ONE-PIECE, DUAL-MATERIAL SUCTION CUP

[75] Inventors: Kevin J. Barnes, Uniontown; Robert W. Flesher, Baltimore; Michael D. Monteleone, Reisterstown, all of Md.

[73] Assignee: Apogee Designs, Ltd., Baltimore, Md.

[21] Appl. No.: 09/209,297

[22] Filed: Dec. 11, 1998

[51] Int. Cl.[7] ...................................................... B32B 1/04
[52] U.S. Cl. ........................... 428/99; 428/64.1; 428/66.7; 428/217; 428/119; 248/205.8; 248/363; 248/206.2
[58] Field of Search ............................ 428/99, 217, 119, 428/66.4, 66.7, 64.1; 248/205.8, 206.2, 205.5, 363

[56] References Cited

U.S. PATENT DOCUMENTS

| | | | |
|---|---|---|---|
| D. 302,107 | 7/1989 | Adams | D8/354 |
| D. 332,390 | 1/1993 | Adams | D8/373 |
| D. 340,181 | 10/1993 | Adams et al. | D8/354 |
| D. 387,468 | 12/1997 | Liu | D26/138 |
| D. 391,009 | 2/1998 | Liu | D26/138 |
| 4,734,027 | 3/1988 | Adams | 425/556 |
| 4,863,129 | 9/1989 | Adams | 248/206.2 |
| 5,029,786 | 7/1991 | Wu | 248/205.7 |
| 5,039,045 | 8/1991 | Adams et al. | 248/206.2 |
| 5,104,077 | 4/1992 | Liu | 248/205.8 |
| 5,133,524 | 7/1992 | Liu | 248/205.8 |
| 5,176,346 | 1/1993 | Liu | 248/206.1 |
| 5,176,357 | 1/1993 | Hobart | 248/683 |
| 5,318,262 | 6/1994 | Adams | 248/205.8 |
| 5,405,112 | 4/1995 | Trethewey | 248/205.8 |
| 5,551,752 | 9/1996 | Trethewey | 248/205.9 |
| 5,588,476 | 12/1996 | Trethewey | 160/370.21 |

*Primary Examiner*—Alexander Thomas
*Attorney, Agent, or Firm*—Sterne, Kessler, Goldstein & Fox P.L.L.C.

[57] ABSTRACT

A one-piece, dual-material suction cup includes an inner face having a concave shape when the cup is inactive (that is, unattached to a surface) and an outer portion having a convex shape when the cup is inactive. The inner and outer portions are formed from different elastic materials. The characteristics of the outer material are selected to exhibit relatively high memory, elasticity and recovery to provide a biasing force on the inner face of the cup to increase the vacuum and enhance attachment. The characteristics of the inner material are selected to exhibit conformity, compliance and softness as compared to the outer material. Such characteristics enhance mating and sealing with a surface to which the cup is to be attached. The inner and outer portions are permanently bonded together to form the one-piece suction cup.

19 Claims, 6 Drawing Sheets

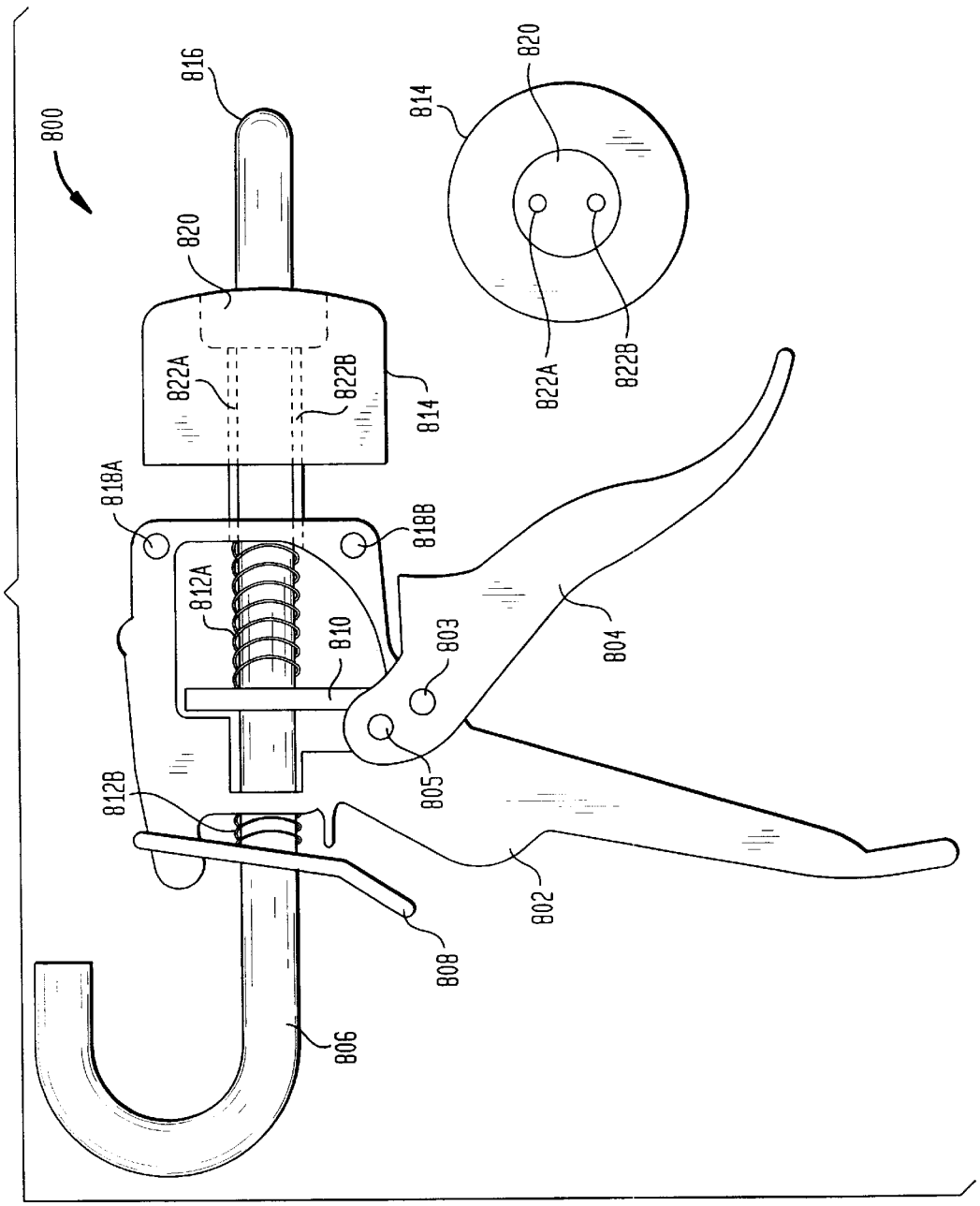

ONE-PIECE, DUAL-MATERIAL SUCTION CUP

BACKGROUND OF THE INVENTION

1. Field of the Invention

The present invention relates generally to suction cups and more specifically to a one-piece suction cup composed of two materials having different properties.

2. Related Art

Suction cups have long been in use to temporarily attach one object to another. Suction cups are not to be confused with vacuum cups, which rely on a device such as a vacuum pump for maintaining a vacuum between the inner surface of the cup and the surface to which the cup is to be attached. The obvious advantage of the suction cup over the vacuum cup is the ease with which the cup may be maneuvered, applied and released. Other advantages include eliminating the need for the vacuum-producing apparatus, thereby reducing cost of manufacture and operation.

Two major problems have plagued users of suction cups from the beginning: early release and early attachment. Early release occurs when a suction cup detaches from a surface earlier than intended. Many attempts have been made to address this problem, including adding an external biasing device to the suction cup to urge its center away from the surface and using a sealant or vacuum grease at the interface between the cup and the surface to enhance the seal. The external biasing device applies an external biasing force to increase the strength of the vacuum within the chamber formed by the cup and the surface, thereby providing a more secure attachment. One such arrangement is disclosed in U.S. Pat. No. 5,133,524 to Liu.

Liu provides a suction cup device comprising a sucking body to be pressed against a surface and a resilient member superimposed above the sucking body that will tend to urge the sucking body away from the surface, which in turn results in the sucking body being more securely attached to the surface. One disadvantage of this approach is that the complexity of the device is increased, thereby increasing both manufacturing costs and likelihood of failure. Another disadvantage is that, while the biasing force increases the strength of the vacuum in the chamber, it does nothing to change the limited "seal zone" of the contact surface.

Early attachment occurs when a suction cup attaches to a surface earlier than intended. Suction cups tend to attach to a surface as soon as contact is made. Early attachment becomes problematic when the location of attachment is important. In many applications it is desirable to slide the suction cup along the surface after contact has been made before activating the cup to achieve final attachment.

SUMMARY OF THE INVENTION

The present invention is a one-piece suction cup formed from two different materials and a method for manufacturing that cup. The cup includes an inner portion defining an inner face having a concave shape when the cup is inactive (that is, unattached to a surface) and an outer portion having a convex shape when the cup is inactive. The inner and outer portions are formed from different elastic materials. The characteristics of the outer material are selected to exhibit relatively high memory, elasticity and recovery to provide a biasing force on the inner face of the cup to increase the vacuum and enhance attachment. The characteristics of the inner material are selected to exhibit conformity, compliance and softness as compared to the outer material. Such characteristics enhance mating and sealing with a surface to which the cup is to be attached (hereafter an "attachment surface"). The inner and outer materials must have characteristics that permit them to be bonded together. Generally, the outer material will have a higher durometer than the inner material. The inner and outer portions are permanently bonded together to form the one-piece suction cup.

In one aspect of the invention the inner face includes at least one channel providing fluid communication to the chamber defined by the inner face and an attachment surface when the cup is inactive. The channels prevent a seal from forming between the inner face of the cup and the attachment surface until the cup is sufficiently depressed against the attachment surface. In a further aspect of the invention the inner face includes a peripheral ring composed of the outer material (or a third material having appropriate characteristics). The peripheral ring contacts the attachment surface when the cup is inactive. The characteristics of the material of the peripheral ring are selected such that the cup can be easily slid across the attachment surface with the cup is inactive without causing premature attachment. The channels in the inner face are generally located across the peripheral ring.

The suction cup of the invention may be manufactured by many known processes. In the preferred embodiment, the process for making the cup includes the steps of: placing a pre-formed inner portion of the cup in a mold, heating a thermoplastic material having appropriate characteristics for the outer portion of the cup, injecting the heated material into the mold to engage the inner portion and allowing the material to cool, thereby forming an outer portion of the cup surrounding and permanently bonded to the inner portion. A process for making the inner portion includes the steps of heating a thermoplastic material having appropriate characteristics for the inner portion of the cup and injecting the heated material into a further mold and allowing the material to cool.

In an alternate embodiment of the invention, a thermoset material rather than the thermoplastic material may be use to form either or both of the inner and outer portions of the cup.

One advantage of the present invention is that it is an integral, one-piece unit.

Another advantage of the present invention is that it solves the early release problem by providing an outer portion that urges the cup away from the attachment surface, thereby increasing the strength and duration of the attachment. Furthermore, the cup provides a larger sealing band (i.e., the area of the inner surface that contacts the attachment surface during activation of the cup) to enhance sealing and reduce susceptibility to early release caused by contaminants or imperfections on the attachment surface.

Another advantage of the present invention is that it solves the early attachment problem. The peripheral ring and the channels in the inner face help prevent premature attachment of the cup.

Yet another advantage of the invention is that the softer material of the inner face conforms well to texture and other surfaces that are not perfectly flat or smooth.

Still another advantage of the invention is a release tab that permits easy release of the suction cup from an attachment surface while substantially preventing inadvertent release via the tab.

BRIEF DESCRIPTION OF THE FIGURES

The features and advantages of the present invention will become more apparent from the detailed description set forth below when taken in conjunction with the drawings in which like reference characters identify corresponding elements throughout and wherein:

FIG. 8 is a schematic of a mounting device for mounting a suction cup onto a sheet of protective material according to a preferred embodiment of the present invention.

DETAILED DESCRIPTION OF THE PREFERRED EMBODIMENTS

Figure 1A:
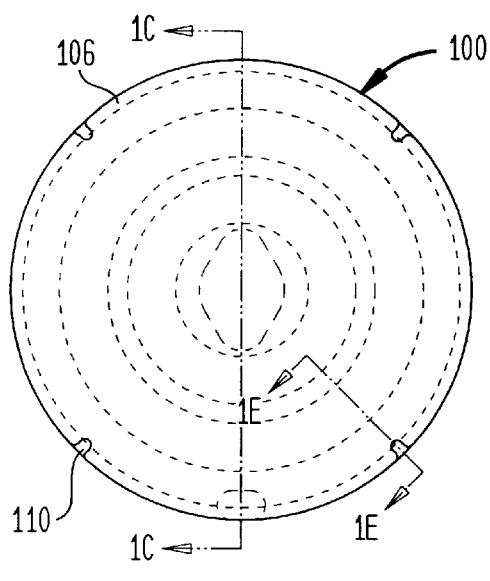
FIGS. 1A–1E are schematic diagrams of a preferred embodiment of the one-piece, dual-material suction cup of the present invention.

The present invention is a one-piece, dual-material suction cup and the process for manufacturing that cup. FIGS. 1A–1E are schematic diagrams of a preferred embodiment of a suction cup 100 of the present invention. Cup 100 includes an outer portion 104 and an inner portion 101 defining an inner face 102 for developing a vacuum with an attachment surface. Both portions 101 and 104 are composed of elastic materials. In a preferred embodiment, the material of outer portion 104 exhibits characteristics of relatively high memory, elasticity and recovery. Such material is hereafter referred to as "high-recovery material." These characteristics permit outer portion 104 to provide a biasing force on inner face 102 of the cup to increase the vacuum between inner face 102 and an attachment surface (not shown). In addition, the high-recovery material of outer portion 104 preferably has the characteristics of being gas-impermeable, non-reactive, non-staining, and resistant to oils.

Also in a preferred embodiment, the material of inner portion 101 exhibits characteristics of conformity, compliance and softness as compared to the high-recovery material of outer portion 104. The inner material must be substantially gas impermeable to maintain a suction. Such material of inner portion 101 is hereafter referred to as "compliant material." The compliant material of inner portion 101 enhances mating and sealing with an attachment surface. Generally, the high-recovery material will have a higher durometer than the compliant material, but this may not always be the case.

This arrangement of different materials forming cup 100 provides two important benefits. First, by virtue of the compliant material, inner face 102 is well suited to forming an airtight seal with an attachment surface when activated (that is, when the cup is flattened against an attachment surface so as to develop a difference in pressure in the space between cup and the surface and the surrounding atmosphere). The high recovery material of outer portion 104 tends to urge the center of cup 100 away from the attachment surface, thereby increasing the vacuum within the chamber between the cup and the surface, which increases the strength of the attachment of the cup to the surface.

In a preferred embodiment, both inner portion 101 and outer portion 104 are composed of thermoplastic elastomers. Thermoplastic elastomers combine the processing advantages of plastics with the rubber-like performance of elastomers. Also known as "two-face systems," these copolymers are comprised of both hard (plastic) and soft (elastomeric) molecular regions, with each region contributing advantages to the final material performance. In such materials, chemically, fully cured thermoset rubber particles are dispersed throughout a continuous thermoplastic matrix. Examples of this class of material are Santoprene™ and Geolast™, available from Monsanto Company, St. Louis, Mo., and Kraton™, available from Shell Oil Company, Houston, Tex. These materials are available in a broad range of durometers and colors. The advantage of these materials over traditional thermosetting materials include significantly increased production speeds (using conventional plastic injection molding machines) and the ability to reuse clean scrap without a loss in physical properties. These materials also provide good uniformity, low degradation and low reactivity with other materials. Moreover, these materials are free of plasticizer which can leach out of the material and damage the finish of the attachment surface when, for example, suction cup 100 is attached to the exterior of an automobile door panel that is coated with paint or clear coat that is not fully cured.

Of course, other materials are available, but suffer from disadvantages. For example, flexible, polyvinyl chloride (PVC) suction cups are readily available and provide excellent properties for making a suction cup. However, the inventors have found that the plasticizer (which is necessary to make the PVC flexible) leaches out of the PVC in sufficient quantities, after some time period (e.g., 48 hours), and damages the finish of the attachment surface.

As mentioned above, the durometer of the high-recovery material is normally higher than the durometer of the compliant material. In addition, the durometer values may be selected in accordance with the type of surface to which the cup will be attached. For application to a lightly textured surface, such as a wall or high-pressure laminate desktop, a compliant material having a durometer of approximately 25 and a high-recovery material having a durometer of approximately 73 may be used. These durometers permit cup 100 to adhere to lightly textured, painted surfaces. The quality of the adhesion will, of course, be dependent on the amount of texturing.

For attachment to a class A surface, such as the painted surface of an automobile door, a compliant material having a durometer of approximately 25 and a high-recovery material having a durometer of approximately 85 may be used. For developing a higher vacuum at the expense of ease of application, the durometer of the high-recovery material can be further increased.

The present invention also has two features that solve the early attachment problem mentioned above. One of these features is a peripheral ring 106 of high-recovery material on the inner face of cup 100. In a preferred embodiment, peripheral ring 106 is formed by extending the high-recovery material of outer portion 104 onto inner face 102, as depicted in FIG. 1C. In an alternative embodiment, peripheral ring 106 can be formed of a third material having appropriate characteristics, including a relatively low coefficient of friction.

Figure 2A:
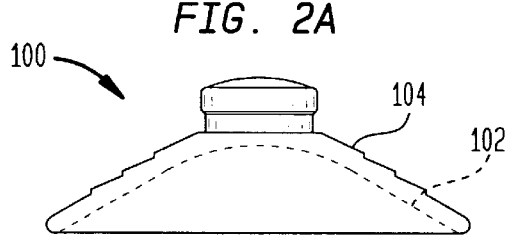
FIGS. 2A–2D provide side and bottom views of the suction cup in its active and inactive states to illustrate the operation of the peripheral ring feature of the present invention.
Figure 2B:
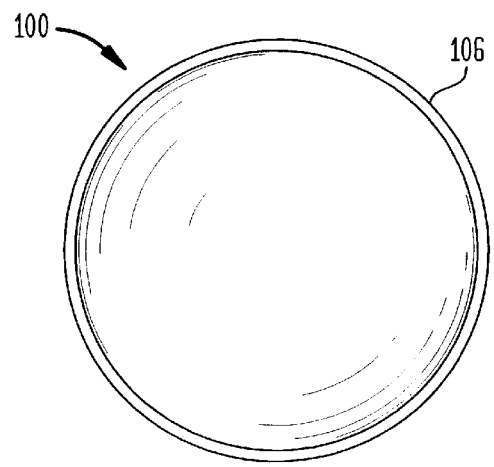

The advantages and operation of peripheral ring 106 are now explained with reference to FIGS. 2A–2D. FIGS. 2A and 2B provide side and bottom views of the suction cup in its inactive state (that is when little or no pressure differential exists between the vacuum chamber formed between inner face 102 and the surrounding atmosphere). Referring to FIG. 2B, it is clear that in the inactive state, only peripheral ring 106 of the suction cup contacts the surface. One advantage of compliant materials is that they readily engage and form an airtight seal with an attachment surface. Conversely, a high-recovery material such as that used to form peripheral ring 106 has a lower coefficient of friction and does not as readily engage and form a seal with an attachment surface. Thus, peripheral ring 106 permits cup 100 to be slid along an attachment surface more easily than if peripheral ring 106 were not present. This is useful for adjusting the position of cup 100 prior to activating the cup for attachment.

In one example application, cup 100 is used to attach a sheet of protective material to an automobile body. In this example, it is useful to cause the suction cups to contact the surface of the body, then position the panel as desired, before activating the suction cups. Suction cup 100 is ideally suited to such use, due in-part to peripheral ring 106.

Figure 2C:
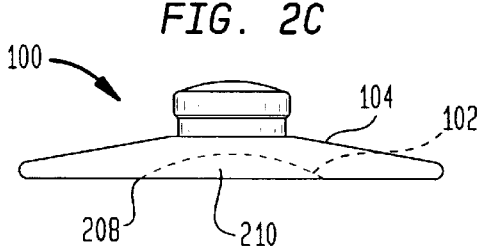
Figure 2D:
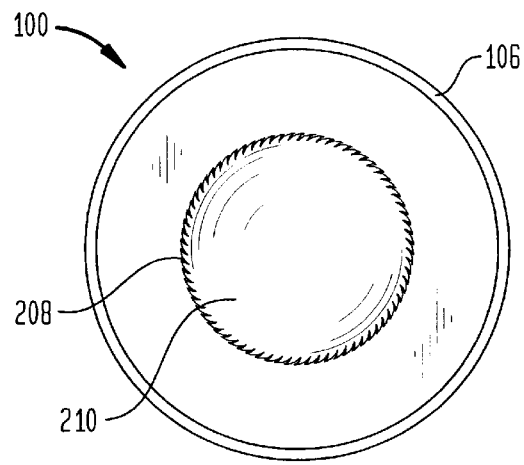

FIGS. 2C and 2D depict side and bottom views of the suction cup of the present invention in its active state (that is, when a substantial vacuum is developed within the chamber 210 defined by inner face 102 and an attachment surface). In this active state, cup 100 is substantially flattened, and inner face 102 of the cup engages the attachment surface to form a sealing band 208. In this active state, the compliant material of inner face 102 engages the attachment surface at seal band 208, thereby preventing further relative motion of the cup with respect to the attachment surface. As discussed below, a conventional suction cup forms a sealing "ring" with an attachment surface. However, cup 100 expands that ring to form a band that provides increased contact area as compared to a sealing ring.

Figure 3A:
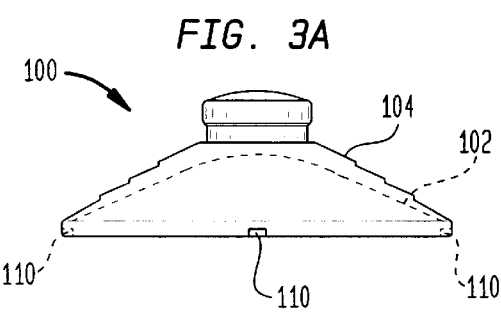
FIGS. 3A–3D provide side and bottom views of the suction cup in its active and inactive states to illustrate the operation of the channel feature of the present invention.
Figure 3B:
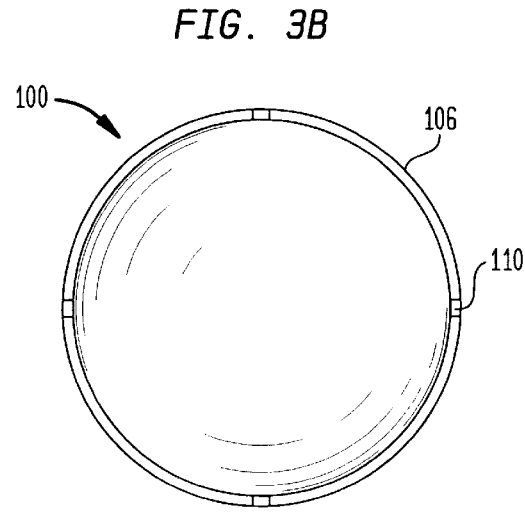

According to a preferred embodiment, the present invention includes a second feature that solves the early attachment problem. According to this embodiment, one or more channels 110 (see FIG. 1A) are formed in inner face 102 at peripheral ring 106. The operation and advantages of these channels are explained with reference to FIGS. 3A–3D. FIGS. 3A and 3B present side and bottom views of cup 100 in its inactive state. As mentioned above, only peripheral ring 106 of cup 100 contacts the surface in the inactive state, as shown in FIGS. 3A and 3B. Also as shown in FIG. 3B, channels 110 permit fluid communication with the chamber defined by inner face 102 and the attachment surface. Therefore, no pressure differential can exist between inner face 102 and the surrounding atmosphere. Because such pressure differentials tend to restrain the relative motion of cup 100 and the attachment surface, channels 110 serve to allow free movement of the cup along the attachment surface until the cup is activated. However, once the cup is activated, channels 110 have no effect, as described below.

Figure 3C:
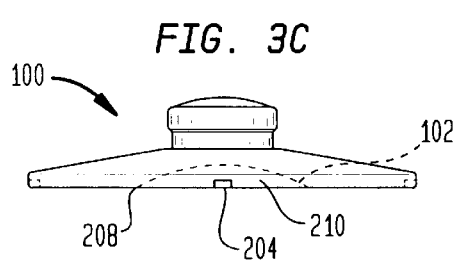
Figure 3D:
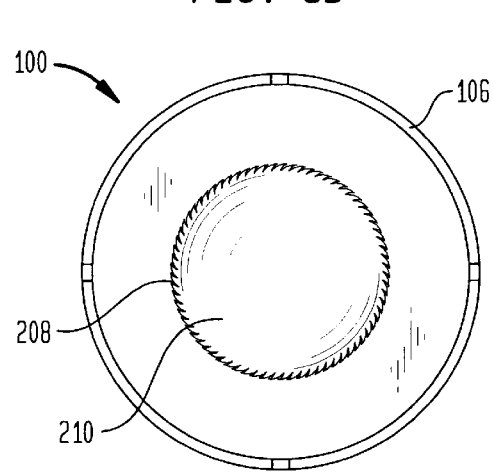

FIGS. 3C and 3D present side and bottom views of cup 100 in its active state. In the active state, cup 100 is substantially flattened, as shown in FIG. 3C. In addition, as shown in FIG. 3D, inner face 102 engages the attachment surface to form seal band 208 defining vacuum chamber 210. From FIG. 3D it is evident that seal band 208 lies within peripheral area 106. Thus, channels 110 do not permit fluid communication with chamber 210. Thus, channels 110 are effective only in the cup's inactive state, and not in its active state. Channels 110 therefore permit relative motion of cup 100 on an attachment surface after contact is made between the two, while not hindering secure attachment of the cup to the surface in the active state. The high-recovery material peripheral ring 106 and channels 110 can be used alone or in combination. In a preferred embodiment, these features are used in combination.

Figure 1B:
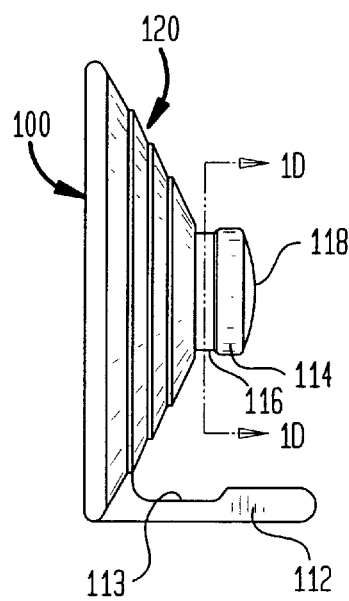
Figure 1C:
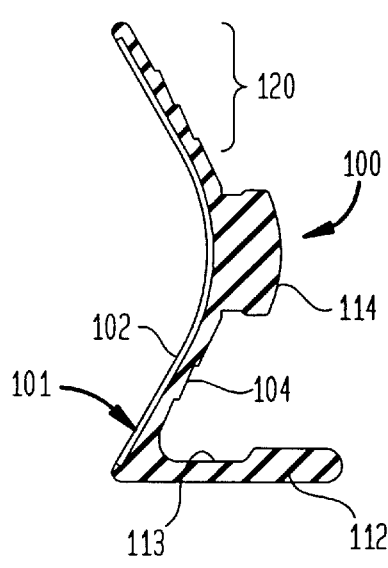
Figure 1D:
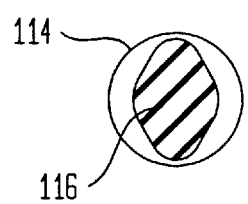
Figure 1E:
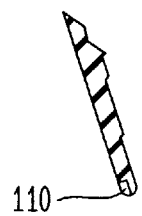

A further feature of the present invention is its release tab 112, shown in FIGS. 1B, 1C and 1D. In a preferred embodiment, release tab 112 is substantially cylindrical and extends longitudinally from a peripheral area of outer portion 104. For ease of manufacture, release tab 112 is composed of the same material as outer portion 104. Of course, release tab 112 may be composed of different materials without departing from the spirit and scope of the present invention. Release tab 112 permits a user to lift the peripheral edge of cup 100 to break the vacuum in chamber 210 and release cup 100 from an attachment surface without requiring the use of undue force.

In a preferred embodiment, release tab 112 has an area 113 of reduced thickness near its point of attachment to outer portion 104. Area 113 substantially reduces the stiffness of tab 112 and prevents an errant side force from unintentionally lifting the peripheral edge of cup 100 and releasing the vacuum from chamber 210.

Figure 4A:
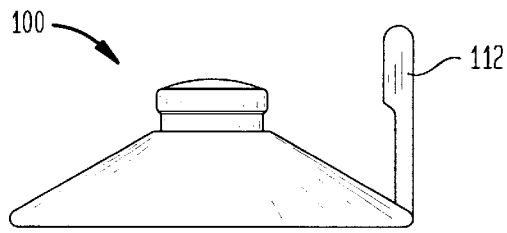
FIGS. 4A and 4B provide side views of the suction cup in its active and inactive states to illustrate the operation of the release tab feature of the present invention.
Figure 4B:
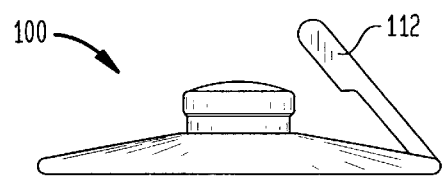

In a preferred embodiment, release tab 112 curves back toward outer portion 104, as shown in FIG. 4A, in the cup's inactive state. When the cup is activated, the outer surface of outer portion 104 becomes substantially parallel to the surface, and causes release tab 112 to lie nearly parallel to the outer surface of outer portion 104. This feature reduces the profile of suction cup 100 and reduces the chance of accidental release.

In a preferred embodiment, cup 110 is of varying thickness, and is thicker toward the center. In one embodiment, this is accomplished by forming a series of radial steps, terraces or rings, on the outer surface 104 of the cup, as shown in FIGS. 1B and 1C at 120. In a preferred embodiment, cup 100 is dimension illustrated in FIGS. 1B and 1C. This dimensioning, with the thickness of the cup decreasing in steps toward the peripheral edge, provides the increased area of contact band 208 as discussed above.

Figure 5:
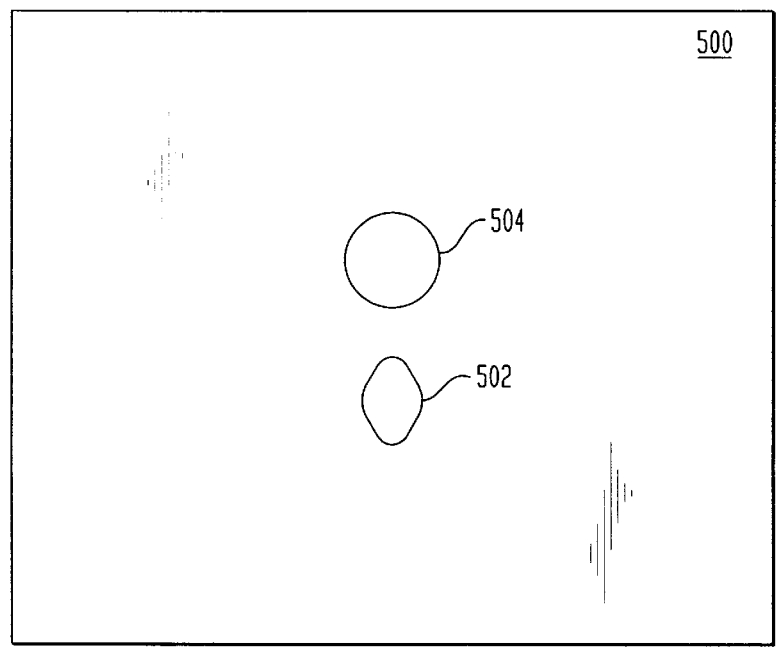
FIG. 5 illustrates use of the cup of the invention for securing a sheet of protective material to an attachment surface.

In one application, suction cup 100 is used to attach a sheet of protective material to a surface. For example, cup 100 is used to attach a sheet of protective material to an automobile during manufacture to prevent damage to the automobile's finish during assembly line work. A portion of such a sheet 500 of protective material is shown in FIG. 5. Sheet 500 includes openings 502 and 504. Opening 502 is configured to receive button 114 to secure cup 100 to sheet 500. Opening 504 is configured to permit release tab 112 to pass though sheet 500 for access by a user.

Figure 6:
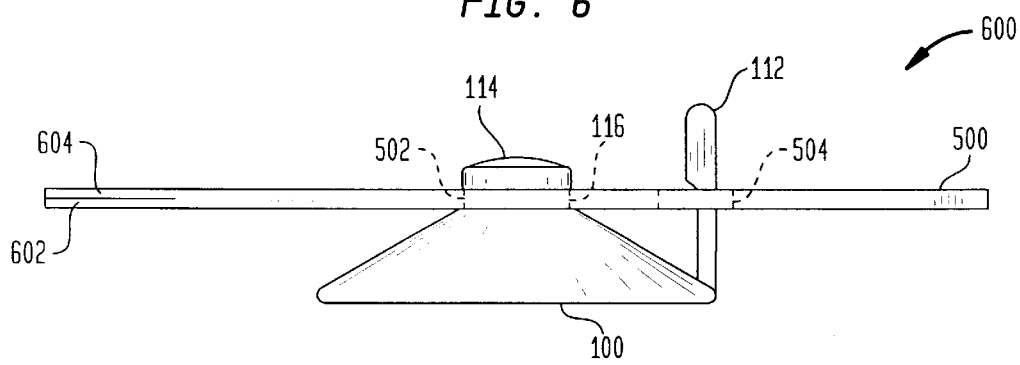
FIG. 6 is a side view of an assembly including a suction cup mounted on a sheet of protective material.

FIG. 6 is a side view of an assembly 600 including suction cup 100 mounted on sheet 500. Neck section 116 is mounted within opening 502 of sheet 500. Button 114 prevents cup 100 from inadvertently being removed from opening 502. Suction cup 100 is aligned so that release tab 112 protrudes through opening 504. Thus, release tab 112 is accessible when it is desired to detach suction cup 100 from an attachment surface. In a preferred embodiment, sheet 500 can be composed of one or more different layers of material. In one embodiment, outer layer 604 is a durable hard plastic and inner layer 602 is a soft foam material designed to prevent damage to the attachment surface. Such a material is commercially available under the brand name HARD-GUARD® from Apogee Designs, Ltd., Baltimore, Md.

Referring to FIG. 6, if suction cup 100 were to rotate with respect to sheet 500, release tab 112 could slip through opening 504 and become inaccessible. If this were to happen, it would be difficult to inactivate suction cup 100 to remove sheet 500. To address this problem, cup 100 features an eccentric neck shape adapted to fit within an eccentric shape of opening 502. FIG. 1B illustrates that a neck section 116 of cup 100 has a reduced diameter as compared to button 114. FIG. 1D is a cross-sectional view illustrating the relative diameters of section 116 and button 114. Note the substantially parallelogram shape of neck 116, which matches the substantially parallelogram shape of opening 502 in sheet 500. The shape of neck 116 and opening 502 substantially prevent cup 100 from rotating relative to sheet 500. Another advantage of this feature is that, by preventing rotation of the cup, wear of neck section 116 is reduced.

In most applications, suction cup 100 is activated by applying pressure to surface 118 of button 114. In order to enhance the comfort and efficiency of the operator, in a preferred embodiment, surface 118 is smooth.

Suction cup 100 functions best when inner face 102 is free of debris. In addition, suction cup 100 is least likely to cause damage to a surface when inner face 102 is free of debris. In one embodiment, inner face 102 is made of a light colored material, so that dark-colored debris can be detected easily by visual inspection. In another embodiment, inner face 102 is made of a dark-colored material so that light-colored debris may be easily detected by visual inspection.

As mentioned above, different material characteristics are chosen for different applications. In one embodiment of the invention, different colors of outer portion 104 may be used to indicate the different material characteristics such as durometer. This arrangement permits easy selection of the proper suction cup for the application at hand.

FIG. 8 is a schematic of an installation tool 800 for mounting suction cup 100 onto sheet 500. Installation tool 800 includes a ratcheting mechanism similar to that found in an ordinary caulk gun, a plunger 814, and a loop of wire 816. Wire loop 816 is inserted through hole 502 and wrapped around neck section 116 of suction cup 100. As plunger 814 is advanced along wire loop 816 by the action of the ratcheting mechanism, button 114 of cup 100 is drawn through hole 502 of sheet 500.

Installation tool 800 is now described in detail. The ratcheting mechanism includes a body 802 and a handle 804 pivotally mounted on body 802 by rivet 803. Push rod 806 is advanced by ratchet lever 810, which is pivotally mounted to handle 804 by rivet 805, by squeezing handle 804 and body 802 together. Push rod 806 can be retracted by applying pressure to thumb lever 808. Springs 812A and 812B bias levers 808 and 810 to their nominal positions. Plunger 814 is mounted on the end of push rod 806. The ends of wire loop 816 are attached to mounting points 818A and 818B, and extends through channels 822A and 822B in plunger 814. Plunger 814 includes a chamber 820 for receiving button 114 of cup 100.

Figure 7:
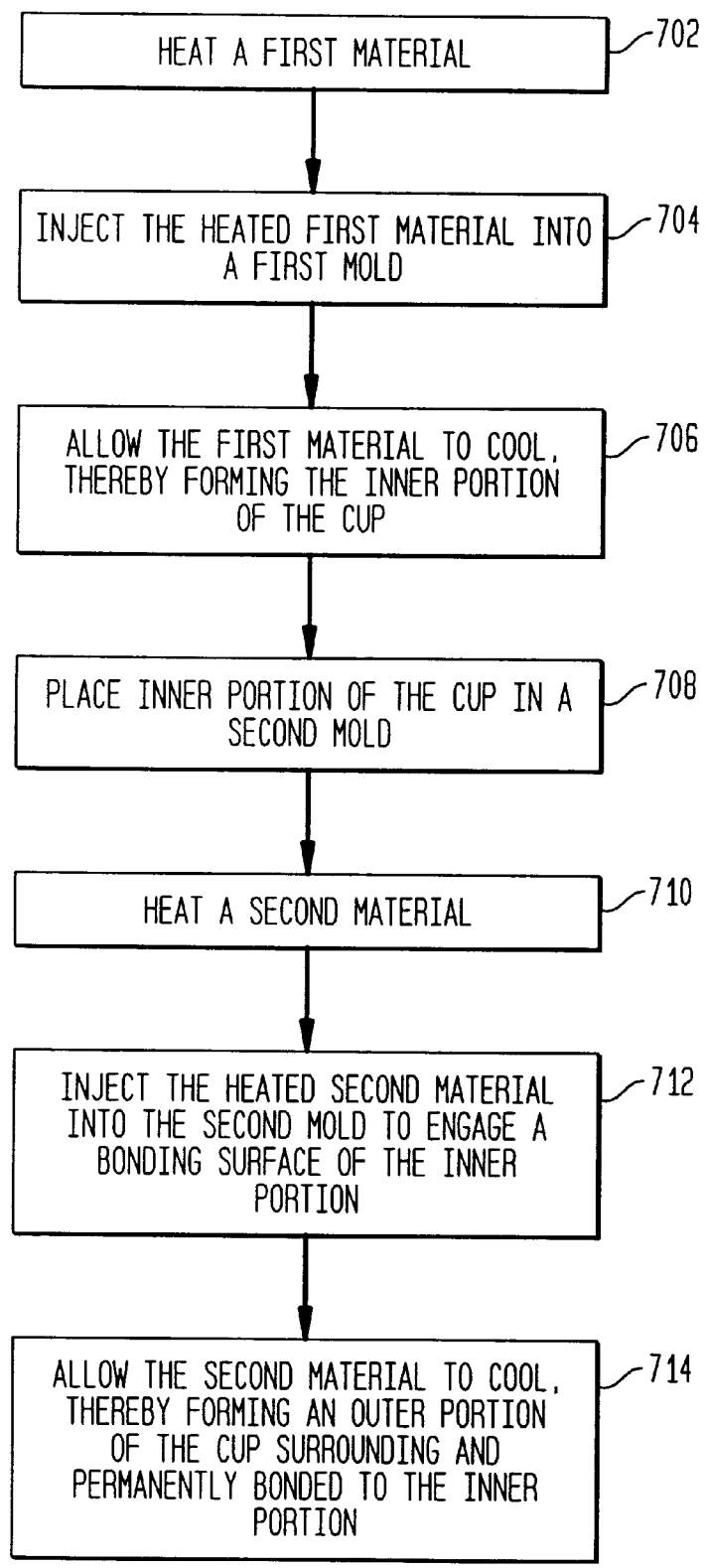
FIG. 7 is a flow chart describing an exemplary process of manufacturing a suction cup according to a preferred embodiment of the present invention.

In a preferred embodiment, suction cup 100 is manufactured by a process known as "insert molding," a process that is well-known in the art. According to this process, a first portion (e.g., inner portion 101) of the suction cup is formed using an injection molding technique. Next, this first portion is placed in a larger mold and the second portion (e.g., outer portion 104) of the cup is formed around it. FIG. 7 is a flowchart describing the process of manufacture according to this embodiment.

Referring to FIG. 7, a first thermoplastic material is heated and injected into a first mold, as shown in steps 702 and 704. The material is allowed to cool, thereby forming inner portion 101 of suction cup 100, as shown in step 706. This first portion is placed in a larger, second mold, as shown in step 708. Then a second thermoplastic material is heated and injected into the mold, as shown in steps 710 and 712. Within the second mold, the second material surrounds and bonds to the first portion. The material is allowed to cool, thereby forming an outer portion of the suction cup that surrounds and is permanently bonded to the inner portion, as shown in step 714. The end result is the one-piece, dual material suction cup 100 of the present invention.

The previous description of the preferred embodiments is provided to enable any person skilled in the art to make or use the present invention. The various modifications to these embodiments will be readily apparent to those skilled in the art, and the generic principles defined herein may be applied to other embodiments without the use of inventive faculty. Thus, the present invention is not intended to be limited to the embodiments shown herein but is to be accorded the widest scope consistent with the principles and novel features disclosed herein.

What is claimed is:

1. A one-piece, dual-material suction cup, comprising:
   an inner portion defining an inner face having a concave shape when the cup is inactive, said inner portion being formed from a compliant material; and
   an outer portion having a convex shape when the cup is inactive, said outer portion being formed from a high-recovery material and being permanently bonded to said inner portion.

2. The one-piece, dual-material suction cup of claim 1, wherein said inner portion comprises:
   a channel at said inner face, said channel providing fluid communication to a chamber defined by said inner face and an attachment surface when the cup is placed upon said attachment surface and the cup is in an inactive state.

3. The one-piece, dual-material suction cup of claim 1, further comprising:
   a peripheral ring on said inner face, said ring being composed of a material having a low-coefficient of friction as compared to said compliant material, said peripheral ring contacting an attachment surface when the cup is placed upon said attachment surface and the cup is in an inactive state.

4. The one-piece, dual-material suction cup of claim 3, wherein said peripheral ring comprises:
   a channel providing fluid communication to a chamber defined by said inner face and said attachment surface when the cup is placed upon said attachment surface and the cup is in said inactive state.

5. The one-piece, dual-material suction cup of claim 4, wherein said peripheral ring is formed by extending said high-recovery material of said outer portion onto said inner face.

6. The one-piece, dual-material suction cup of claim 5, wherein:
   said high-recovery material and said resilient material are selected from the group consisting of thermoplastic materials and thermoset rubbers, said high-recovery material having the characteristics of being gas-impermeable, non-reactive, non-staining, and resistant to oils.

7. The one-piece, dual-material suction cup of claim 6, further comprising:

a substantially rectangular release tab extending longitudinally from a peripheral area of said outer portion, said release tab having a reduced thickness near the point of attachment to said outer portion.

8. The one-piece, dual-material suction cup of claim 7, wherein said release tab is curved toward said outer portion such that said tab lies substantially parallel to said outer portion when the cup is active.

9. The one-piece, dual-material suction cup of claim 1, further comprising:

a substantially cylindrical stem extending longitudinally from a central area of said outer portion, a portion of said stem having a non-round shaped cross-section to prevent rotation of the cup when said stem is inserted into a similarly shaped hole.

10. The one-piece, dual-material suction cup of claim 1, wherein the thickness of the cup is greater near the center than near the perimeter.

11. The one-piece, dual-material suction cup of claim 10, wherein said outer portion of the cup is terraced to provide a greater thickness near the center than near the perimeter, said terracing increasing the area of a contact band between said inner face and an attachment surface when the cup is activated.

12. The one-piece, dual-material suction cup of claim 1, wherein:

said compliant material has a light color to aid visual detection of debris on said inner face.

13. The one-piece, dual-material suction cup of claim 1, wherein:

said compliant material has a dark color to aid visual detection of debris on said inner face.

14. The one-piece, dual-material suction cup of claim 1, wherein:

said high-recovery material has a color indicative of its durometer.

15. A process for making a one-piece, dual-material suction cup, comprising the steps of:

heating a first material;

injecting said first material into a mold to form a first portion of the cup;

placing said first portion of the cup into a second mold;

heating a second material; and injecting said second material into said second mold to form a second portion of the cup, whereby said first portion is bonded to said second portion to form the one-piece, dual-material suction cup.

16. The process of claim 15, wherein said first material is a compliant material and said first portion is an inner portion of the cup.

17. The process of claim 16, wherein said second material is a high-recovery material and said second portion is an outer portion of the cup.

18. The process of claim 15, wherein said first material is a high-recovery material and said first portion is an outer portion of the cup.

19. The process of claim 18, wherein said second material is a compliant material and said second portion is an inner portion of the cup.

* * * * *